US012208545B2

(12) United States Patent
Manami et al.

(10) Patent No.: US 12,208,545 B2
(45) Date of Patent: *Jan. 28, 2025

(54) RESIN PELLET AND METHOD OF PRODUCING RESIN PELLET

(71) Applicant: SUMITOMO CHEMICAL COMPANY, LIMITED, Tokyo (JP)

(72) Inventors: Toshihiko Manami, Chihara (JP); Shohei Ueno, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/210,081

(22) Filed: Jun. 15, 2023

(65) Prior Publication Data
US 2023/0339144 A1    Oct. 26, 2023

Related U.S. Application Data

(63) Continuation of application No. 16/992,431, filed on Aug. 13, 2020, now Pat. No. 11,717,988.

(30) Foreign Application Priority Data

Oct. 30, 2019   (JP) .................................. 2019-197407

(51) Int. Cl.
*B29B 9/12*      (2006.01)
*B29B 9/06*      (2006.01)
*C08L 23/06*     (2006.01)

(52) U.S. Cl.
CPC .................. *B29B 9/12* (2013.01); *B29B 9/06* (2013.01); *C08L 23/06* (2013.01); *B29K 2023/06* (2013.01); *Y10T 428/2982* (2015.01)

(58) Field of Classification Search
None
See application file for complete search history.

(56) References Cited

U.S. PATENT DOCUMENTS

| 2010/0295205 A1 | 11/2010 | Isaki et al. |
| 2013/0001823 A1 | 1/2013 | Ejiri |

FOREIGN PATENT DOCUMENTS

| CN | 108884252 A | 11/2018 |
| JP | H07-1447 A | 1/1995 |
| JP | 09104061 A * | 4/1997 |
| JP | 2005-254592 A | 9/2005 |
| JP | 2007-197666 A | 8/2007 |
| JP | 4394362 B2 | 1/2010 |

(Continued)

OTHER PUBLICATIONS

Machine translation JP-09104061-A (Year: 2024).*

(Continued)

*Primary Examiner* — Alexandre F Ferre
(74) *Attorney, Agent, or Firm* — Foley & Lardner LLP

(57) ABSTRACT

There are provided a resin pellet having high transportability in a solid state in a feeder and a method of producing the same. A resin pellet has a recess, and when a height of the resin pellet in a case in which the resin pellet is disposed on a horizontal plane in such a manner that the recess faces the horizontal plane is defined as T1, and a maximum diameter of the resin pellet as viewed from a direction perpendicular to the horizontal plane is defined as L, an aspect ratio defined by L/T1 is 1.2 to 1.8.

16 Claims, 5 Drawing Sheets

(56) References Cited

FOREIGN PATENT DOCUMENTS

| JP | 4918142 B2 | 4/2012 |
| JP | 2015-093965 A | 5/2015 |
| JP | 5845595 B2 | 1/2016 |

OTHER PUBLICATIONS

English translation of Chinese Patent Application No. CN20178020924 (Chinese Patent No. CN108884252-A), dated Mar. 31, 2017.
English translation of Japanese Patent Application No. JP2005-254592A (Japanese Patent No. JP4222231B2), dated Sep. 22, 2005.
English translation of Japanese Patent Application No. JP2007-197666A (Japanese Patent No. JP4657188B2), dated Sep. 8, 2007.
Third-Party Submission, dated Jul. 12, 2022, issued in corresponding Japanese Patent Application No. JP2019-197407.

\* cited by examiner

RESIN PELLET AND METHOD OF PRODUCING RESIN PELLET

CROSS-REFERENCE TO RELATED PATENT APPLICATION

The present application is the Continuation of U.S. patent application Ser. No. 16/992,431, filed on Aug. 13, 2020, which claims the benefit of priority from Japanese Patent Application No. 2019-197407, filed on Oct. 30, 2019. The contents of the applications are incorporated herein by reference in their entireties.

BACKGROUND OF THE INVENTION

Field of the Invention

The present invention relates to a resin pellet and a method of producing a resin pellet.

Description of the Related Art

Resin pellets to be supplied to an injection molding apparatus or the like have been known.

Examples of the related art include JP-A-2015-093965.

SUMMARY OF THE INVENTION

However, in the case of the resin pellets according to the related art, transportability of the resin pellet in a solid state in a feeder is not necessarily sufficient.

An object of the present invention is to provide a resin pellet having high transportability in a solid state in a feeder and a method of producing the same.

According to the present invention, there is provided a resin pellet having a recess, wherein when a height of the resin pellet in a case in which the resin pellet is disposed on a horizontal plane in such a manner that the recess faces the horizontal plane is defined as T1, and a maximum diameter of the resin pellet as viewed from a direction orthogonal to the horizontal plane is defined as L, an aspect ratio defined by L/T1 is 1.2 to 1.8.

In the resin pellet, when cross-sectional images of the resin pellet perpendicular to the horizontal plane and perpendicular to a direction of the maximum diameter L are obtained by an X-ray CT apparatus at regular intervals in the direction of the maximum diameter L, a width W of the recess in the cross-sectional image in which a depth D of the recess is maximized may be 1.7 mm to 2.3 mm, where the depth D of the recess is a distance between a tangent line tangent to two protrusions on both sides of the recess and the deepest portion of the recess in the cross-sectional image, and the width W of the recess is a distance between tangent points of the two protrusions on the tangent line in the cross-sectional image.

In the resin pellet, when cross-sectional images of the resin pellet perpendicular to the horizontal plane and perpendicular to a direction of the maximum diameter L are obtained by an X-ray CT apparatus at regular intervals in the direction of the maximum diameter L, a depth D of the recess in the cross-sectional image in which the depth D of the recess is maximized may be 0.2 mm to 0.6 mm, where the depth D of the recess is a distance between a tangent line tangent to two protrusions on both sides of the recess and the deepest portion of the recess in the cross-sectional image.

In the resin pellet, when cross-sectional images of the resin pellet perpendicular to the horizontal plane and perpendicular to a direction of the maximum diameter L are obtained by an X-ray CT apparatus at regular intervals in the direction of the maximum diameter L, a length C of a curve of the recess in the cross-sectional image in which a depth D of the recess is maximized may be 2.0 mm to 2.4 mm, where the depth D of the recess is a distance between a tangent line tangent to two protrusions on both sides of the recess and the deepest portion of the recess in the cross-sectional image, and the length C of the curve of the recess is a length between two tangent points tangent to the tangent line in a contour of the resin pellet in the cross-sectional image.

In the resin pellet, when cross-sectional images of the resin pellet perpendicular to the horizontal plane and perpendicular to a direction of the maximum diameter L are obtained by an X-ray CT apparatus at regular intervals in the direction of the maximum diameter L, a ratio (W/D) of a width W of the recess to a depth D of the recess in the cross-sectional image in which the depth D of the recess is maximized may be 3.5 to 7.0, where the depth D of the recess is a distance between a tangent line tangent to two protrusions on both sides of the recess and the deepest portion of the recess in the cross-sectional image, and the width W of the recess is a distance between tangent points of the two protrusions on the tangent line in the cross-sectional image.

In the resin pellet, when cross-sectional images of the resin pellet perpendicular to the horizontal plane and perpendicular to a direction of the maximum diameter L are obtained by an X-ray CT apparatus at regular intervals in the direction of the maximum diameter L, a ratio (W/S) of a width W of the recess to a width S of the resin pellet in the cross-sectional image in which a depth D of the recess is maximized may be 0.05 to 0.15, where the depth D of the recess is a distance between a tangent line tangent to two protrusions on both sides of the recess and the deepest portion of the recess in the cross-sectional image, the width W of the recess is a distance between tangent points of the two protrusions on the tangent line in the cross-sectional image, and the width S of the resin pellet is a distance between two second tangent lines perpendicular to the tangent line and having the resin pellet interposed therebetween in the cross-sectional image.

In the resin pellet, when cross-sectional images of the resin pellet perpendicular to the horizontal plane and perpendicular to a direction of the maximum diameter L are obtained by an X-ray CT apparatus at regular intervals in the direction of the maximum diameter L, a ratio (D/T2) of a depth D of the recess to a height T2 of the resin pellet in the cross-sectional image in which the depth D of the recess is maximized may be 0.1 to 0.2, where the depth D of the recess is a distance between a tangent line tangent to two protrusions on both sides of the recess and the deepest portion of the recess in the cross-sectional image, and the height T2 of the resin pellet is a distance between the tangent line and a third tangent line parallel to the tangent line and having the resin pellet interposed between the tangent line and the third tangent line in the cross-sectional image.

In the resin pellet, the aspect ratio may be 1.4 to 1.5.

A volume standard deviation of the resin pellet may be 0.5 to 3.5 $mm^3$.

A surface area standard deviation of the resin pellet may be 0.5 to 4.0 $mm^2$.

A weight standard deviation of the resin pellet may be 0.5 to 3.0 mg.

An HDD hardness of the resin pellet may be 60 to 70.

A resin of the resin pellet may be a polyolefin-based resin.

A resin of the resin pellet may be a polyethylene-based resin.

According to the present invention, there is provided a method of producing a resin pellet, the method including: melting a resin to obtain a molten resin; extruding the molten resin from through-holes of a die plate; and cutting the extruded molten resin by a cutter rotating while cooling the extruded molten resin with water to obtain a resin pellet, wherein in the cutting, an amount of water supplied to the extruded molten resin is 80 $m^3/h$ to 160 $m^3/h$, and when viewed from an axial direction of the rotation of the cutter, an extending direction of a blade edge of the cutter is inclined at 20° to 50° in a direction opposite to a rotating direction of the rotary cutter based on a line connecting a rotation center of the rotary cutter and an end of the blade edge that is close to the rotation center of the rotary cutter.

An angle formed by a flow direction of the water supplied to the extruded molten resin and an injection direction of the molten resin may be 80° to 100°.

The flow direction of the water supplied to the extruded molten resin may be a vertical direction, and the injection direction of the molten resin may be a horizontal direction.

According to the present invention, there are provided a resin pellet having high transportability in a solid state in a feeder and a method of producing the same.

DETAILED DESCRIPTION OF THE PREFERRED EMBODIMENTS

Figure 1A:
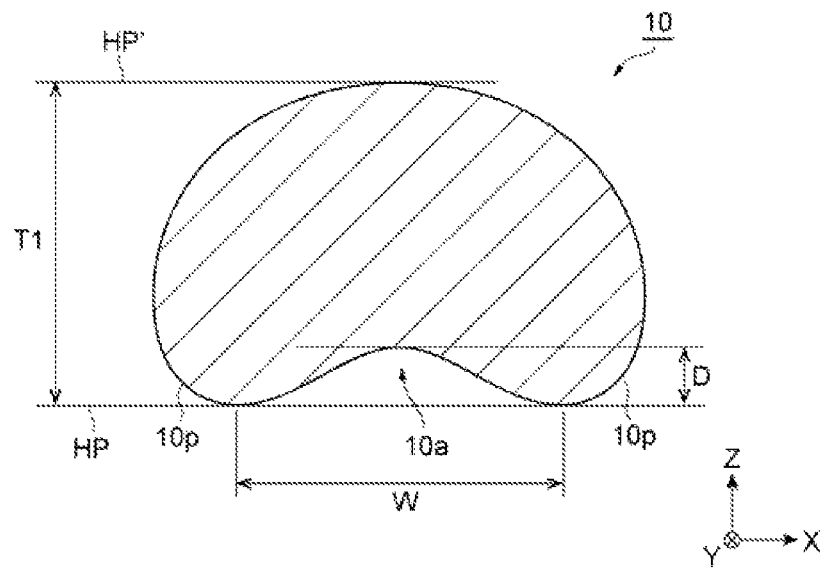
FIG. 1A is a vertical cross-sectional view illustrating a state where a resin pellet according to a first embodiment of the present invention is disposed on a horizontal plane in such a manner that a recess of the resin pellet faces the horizontal plane.

An embodiment of the present invention will be described with reference to the drawings. FIG. 1A is a vertical cross-sectional view illustrating a state where a resin pellet 10 according to a first embodiment of the present invention is disposed on a horizontal plane HP in such a manner that a recess 10a of the resin pellet 10 faces the horizontal plane HP, and FIG. 1A is an a-a cross-sectional view of FIG. 1B.

The resin pellet 10 according to the embodiment of the present invention has the recess 10a and is formed in a flat shape. When a height of the resin pellet 10 in the case in which the resin pellet 10 is disposed on the horizontal plane HP in such a manner that the recess 10a faces the horizontal plane HP is defined as T1, and a maximum diameter of the resin pellet as viewed from a direction perpendicular to the horizontal plane HP is defined as L, an aspect ratio defined by L/T1 is 1.2 to 1.8. The aspect ratio can be 1.4 to 1.5.

Figure 1B:
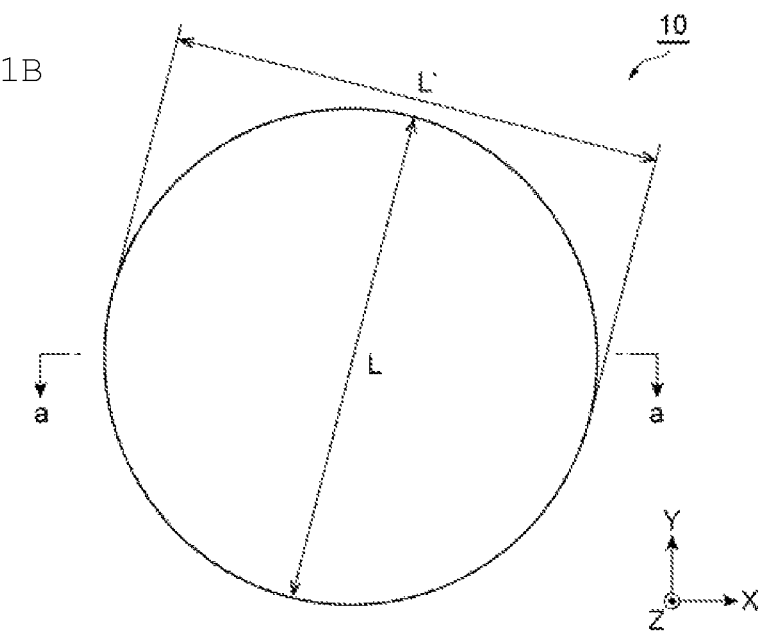
FIG. 1B is a top view of FIG. 1A.

In the case in which the resin pellet 10 is disposed on the horizontal plane HP in such a manner that the recess 10a faces the horizontal plane HP, as illustrated in FIGS. 1A and 1B, at least a part of an annular protrusion 10p around the recess 10a comes into contact with the horizontal plane HP.

An upper portion of the resin pellet 10 can be rounded so that a central portion of the upper portion has the highest height when viewed from above and the height is decreased toward the outside. A lower portion of the resin pellet 10 has the recess 10a at the central portion when viewed from below. Each of downward protrusions 10p is formed into an annular shape around the recess 10a.

The maximum diameter L and the height T1 can be measured with an optical microscope such as a stereoscopic microscope. That is, the resin pellet 10 is disposed on the horizontal plane HP in such a manner that the recess 10a faces the horizontal plane HP as illustrated in FIGS. 1A and 1B, and the resin pellet is observed from a horizontal direction as in FIG. 1A. Thus, a distance between the horizontal plane HP and a line HP' parallel to the horizontal plane HP and tangent to the top of the resin pellet 10 can be obtained as the height T1.

In addition, the resin pellet 10 disposed as described above is observed vertically downward as in FIG. 1B, and then, a maximum diameter of a diameter of the resin pellet can be obtained as L. The maximum diameter is a diameter having a maximum length in all directions.

A ratio of a diameter L' (also referred to as a "second diameter") in a direction orthogonal to the maximum diameter L to the maximum diameter L of the resin pellet 10 in FIG. 1B is preferably 80 to 100%, and more preferably 90 to 100%.

In general, a direction of the resin extruded from through-holes of a die plate (details will be described below) coincides with a direction of the height T1 of the resin pellet (Z direction of FIGS. 1A and 1B).

When cross-sectional images of the resin pellet 10 according to the present embodiment perpendicular to the horizontal plane HP and perpendicular to a direction of the maximum diameter L are obtained by an X-ray computed tomography (CT) apparatus at regular intervals in the direction of the maximum diameter L, the resin pellet 10 according to the present embodiment can satisfy at least one of the following conditions.

As an example, the regular interval for capturing the X-ray CT image is 1 to 90 μm, and is preferably 25 μm.

Condition (a): a width W of the recess 10a in the cross-sectional image (hereinafter, referred to as a "specific cross-sectional image) in which a depth D of the recess 10a is maximized is 1.7 mm to 2.3 mm.

Figure 2:
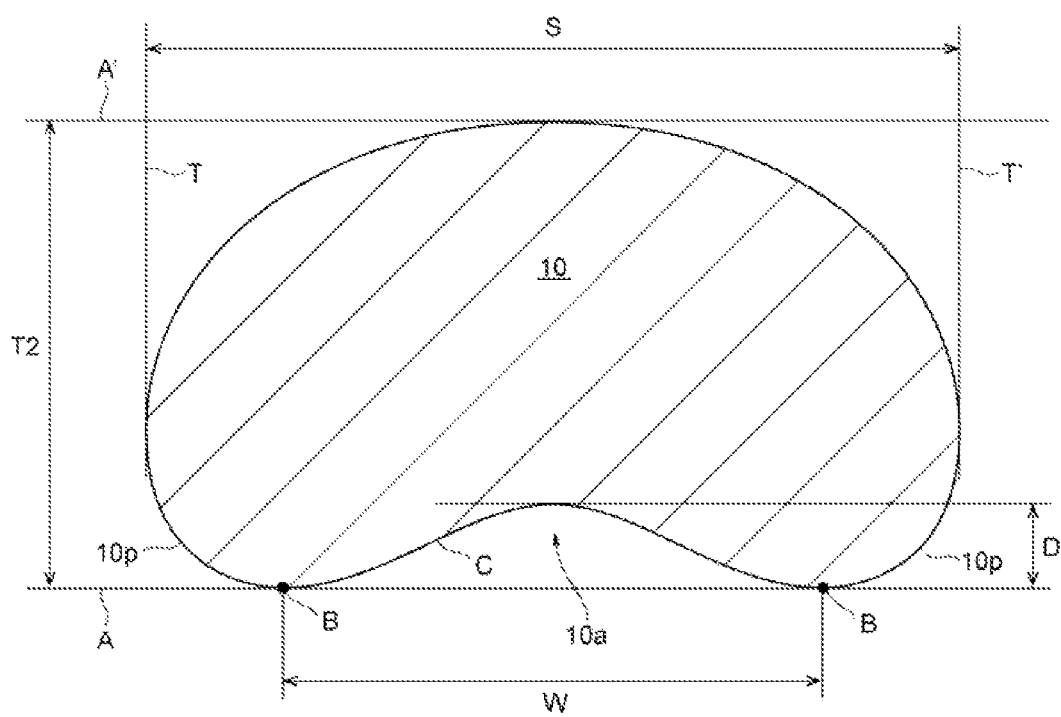
FIG. 2 illustrates an example of an X-ray CT cross-sectional image of a resin pellet according to an example of the present invention.

Here, as illustrated in FIG. 2, in the X-ray CT cross-sectional image, the depth D of the recess 10a is a distance between a tangent line A tangent to the two protrusions 10p on both sides of the recess 10a and the deepest portion of the recess 10a, and the width W of the recess 10a is a distance between tangent points B and B of the two protrusions 10p on the tangent line A.

Condition (b): the depth D of the recess 10a in the specific cross-sectional image is 0.2 mm to 0.6 mm.

Condition (c): a length C of a curve of the recess 10a in the specific cross-sectional image is 2.0 mm to 2.4 mm.

Here, the length C of the curve of the recess 10a is a length between the two tangent points B and B tangent to the tangent line A in a contour of the resin pellet 10 in the specific cross-sectional image.

Condition (d): a ratio (W/D) of the width W of the recess to the depth D of the recess in the specific cross-sectional image is 3.5 to 7.0.

The width W of the recess is a distance between the tangent points B and B of the two protrusions 10$p$ on the tangent line A in the specific cross-sectional image.

Condition (e): a ratio (W/S) of the width W of the recess and a width S of the resin pellet in the specific cross-sectional image is 0.05 to 0.15.

Here, the width S of the resin pellet is a distance between two tangent lines (second tangent lines) T and T' perpendicular to the tangent line A and having the resin pellet 10 interposed therebetween in the specific cross-sectional image.

Condition (f): a ratio (D/T2) of the depth D of the recess to a height T2 of the resin pellet in the specific cross-sectional image is 0.1 to 0.2.

Here, the height T2 of the resin pellet is a distance between the tangent line A and a tangent line (third tangent line) A' parallel to the tangent line A and having the resin pellet 10 interposed between the tangent line A' and the tangent line A in the specific cross-sectional image.

A volume standard deviation of the resin pellet according to the present embodiment can be 0.5 to 3.5 mm$^3$. The volume standard deviation is preferably 0.5 to 2.0 mm$^3$.

A surface area standard deviation of the resin pellet according to the present embodiment can be 0.5 to 4.0 mm$^2$.

A weight standard deviation of the resin pellet according to the present embodiment can be 0.5 to 3.0 mg. The weight standard deviation is preferably 0.5 to 2.0 mg.

In addition, an HDD hardness of the resin pellet according to the present embodiment can be 60 to 70.

Resin

A resin constituting the resin pellet may be composed of only a polymer, and may contain an additive in addition to the polymer. A mass percentage of the polymer in the resin can be 50% or more, 70% or more, 90% or more, or 95% or more.

Examples of the additive include an antioxidant, a weather-resistant agent, a slipping agent, an anti-blocking agent, an antistatic agent, an anti-fogging agent, a non-dripping agent, a pigment, and a filler.

Examples of the resin include a polyolefin-based resin, a (meth)acrylic resin, a polycarbonate-based resin, a polyetherimide-based resin, a polyester-based resin, a polystyrene-based resin, a polyethersulfone-based resin, a fluorine-based resin, an acrylonitrile-butadiene-styrene (ABS)-based resin, an acrylonitrile-styrene (AS)-based resin, and a polyvinyl chloride-based resin. The resin may be a mixture of a plurality of kinds of resins. Among these resins, a polyolefin-based resin is preferable.

Polyolefin-Based Resin

Examples of the polyolefin-based resin include a polyethylene-based resin and a polypropylene-based resin.

Polyethylene-Based Resin

The polyethylene-based resin contains an ethylene-based polymer. Examples of the ethylene-based polymer include an ethylene homopolymer, an ethylene-α-olefin copolymer, and a copolymer of an α-olefin substituted with an alicyclic compound and ethylene.

An example of the ethylene homopolymer includes a high-pressure low-density polyethylene (LDPE) having a density of 910 to 935 kg/m$^3$, which is produced by random bonding of repeating units of ethylene to have a branched structure by high-pressure radical polymerization using a radical initiator.

Examples of the ethylene-α-olefin copolymer can include a linear low-density polyethylene having crystallinity, and an ethylene-α-olefin copolymer elastomer having low crystallinity and rubber-like elastic properties.

A density of the linear low-density polyethylene can be 900 to 940 kg/m$^3$, and a density of the ethylene-α-olefin copolymer elastomer can be 860 to 900 kg/m$^3$.

An example of the α-olefin includes an α-olefin having 3 to 10 carbon atoms, and examples of the α-olefin having 3 to 10 carbon atoms can include propylene, 1-butene, 1-pentene, 1-hexene, 4-methyl-1-pentene, 1-octene, 1-decene, and 3-methyl-1-butene. The α-olefin having 3 to 10 carbon atoms is preferably an α-olefin having 4 to 10 carbon atoms, and more preferably 1-butene, 1-hexene, or 1-octene.

An example of the α-olefin substituted with an alicyclic compound includes vinyl cyclohexane.

The amount of structural unit derived from an α-olefin in the ethylene-based polymer can be 4.0 to 20% by mass.

Specific examples of the ethylene-α-olefin copolymer include an ethylene-1-butene copolymer, an ethylene-1-hexene copolymer, an ethylene-1-octene copolymer, an ethylene-1-decene copolymer, and an ethylene-(3-methyl-1-butene) copolymer. These copolymers may be used alone or as a mixture of two or more thereof. In addition, the ethylene-based polymer may be a mixture of an ethylene homopolymer and an ethylene-α-olefin copolymer.

A melt flow rate of the ethylene-based polymer measured at a measurement temperature of 190° C. and a load of 2.16 kg can be 0.5 to 50 g/10 min, preferably 1 to 30 g/10 min, and more preferably 1 to 20 g/10 min.

The ethylene-based polymer can be produced by a known polymerization method using a known polymerization catalyst.

Examples of the polymerization catalyst can include a homogeneous catalyst system represented by a metallocene catalyst, a Ziegler catalyst system, and a Ziegler-Natta catalyst system. Examples of the homogeneous catalyst system can include a catalyst system composed of a cyclopentadienyl ring-containing transition metal compound of group 4 in the periodic table and alkylaluminoxane, a catalyst system composed of a cyclopentadienyl ring-containing transition metal compound of group 4 in the periodic table, a compound that forms an ionic complex by reacting with the cyclopentadienyl ring-containing transition metal compound, and an organoaluminum compound, a catalyst system modified by supporting, on an inorganic particle such as silica and clay mineral, catalyst components such as a cyclopentadienyl ring-containing transition metal compound of group 4 in the periodic table, a compound that forms an ionic complex, and an organoaluminum compound, and a pre-polymerization catalyst system prepared by pre-polymerizing ethylene or an α-olefin in the presence of the above catalyst system.

The high-pressure low-density polyethylene (LDPE) can be produced using a radical initiator as a polymerization catalyst.

Polypropylene-Based Resin

The polypropylene-based resin contains a propylene-based polymer. Examples of the propylene-based polymer include a propylene homopolymer, and a copolymer of ethylene and/or an α-olefin having 4 to 10 carbon atoms and propylene.

A melt flow rate of the propylene homopolymer measured at a measurement temperature of 230° C. and a load of 2.16 kg can be 0.1 to 50 g/10 min.

A melt flow rate (MFR) of the copolymer of ethylene and/or an α-olefin having 4 to 10 carbon atoms and propylene measured at a measurement temperature of 230° C. and a load of 2.16 kg can be 10 to 200 g/10 min.

When a total mass of the copolymer of ethylene and/or an α-olefin having 4 to 10 carbon atoms and propylene is 100% by mass, a structural unit derived from the ethylene and/or the α-olefin having 4 to 10 carbon atoms can be 0.1 to 40% by weight, and a structural unit derived from the propylene can be 99.9 to 60% by weight.

Herein, the term "structural unit" such as the "structural unit derived from ethylene" refers to a polymerized unit of monomers. Accordingly, for example, the "structural unit derived from ethylene" refers to a structural unit of —$CH_2CH_2$—.

Examples of the α-olefin having 4 to 10 carbon atoms can include 1-butene, 1-pentene, 1-hexene, 4-methyl-1-pentene, 1-octene, and 1-decene, and the α-olefin having 4 to 10 carbon atoms is preferably 1-butene, 1-hexene, or 1-octene.

Specific examples of the copolymer of ethylene and/or an α-olefin having 4 to 10 carbon atoms and propylene can include a propylene-ethylene random copolymer, a random copolymer of propylene and an α-olefin having 4 to 10 carbon atoms, a random copolymer of propylene, ethylene, and an α-olefin having 4 to 10 carbon atoms, and a propylene block copolymer. These copolymers may be used alone or as a mixture of two or more thereof. The propylene-based polymer may be a mixture of a propylene homopolymer and a copolymer of ethylene and/or an α-olefin having 4 to 10 carbon atoms and propylene.

Examples of the random copolymer of propylene and an α-olefin having 4 to 10 carbon atoms can include a propylene-1-butene random copolymer, a propylene-1-hexene random copolymer, a propylene-1-octene random copolymer, and a propylene-1-decene random copolymer.

Examples of the random copolymer of propylene, ethylene, and an α-olefin having 4 to 10 carbon atoms can include a propylene-ethylene-1-butene copolymer, a propylene-ethylene-1-hexene copolymer, a propylene-ethylene-1-octene copolymer, a propylene-ethylene-1-decene copolymer.

The propylene-based polymer can be produced by a known polymerization method using a known olefin polymerization catalyst.

Examples of the polymerization catalyst can include a Ziegler catalyst system, a Ziegler-Natta catalyst system, a catalyst system composed of a cyclopentadienyl ring-containing transition metal compound of group 4 in the periodic table and alkylaluminoxane, a catalyst system composed of a cyclopentadienyl ring-containing transition metal compound of group 4 in the periodic table, a compound that forms an ionic complex by reacting with the cyclopentadienyl ring-containing transition metal compound, and an organoaluminum compound, a catalyst system modified by supporting, on an inorganic particle such as silica and clay mineral, catalyst components such as a cyclopentadienyl ring-containing transition metal compound of group 4 in the periodic table, a compound that forms an ionic complex, and an organoaluminum compound, and a pre-polymerization catalyst system prepared by pre-polymerizing ethylene or an α-olefin in the presence of the above catalyst system.

Acrylic Resin

The acrylic resin contains an acrylic polymer. Examples of the acrylic polymer include a polymer of an acrylic acid derivative such as acrylic acid and ester thereof, a polymer of a methacrylate derivative such as methacrylate and ester thereof, and a copolymer of an acrylic acid derivative and a methacrylate derivative.

Examples of the acrylic polymer include a methacrylic homopolymer containing only monomer unit derived from alkyl methacrylate having an alkyl group having 1 to 4 carbon atoms; and a methacrylic copolymer containing a monomer unit derived from alkyl methacrylate having an alkyl group having 1 to 4 carbon atoms in an amount of 50% by weight or more and less than 100% by weight, and containing another monomer unit derived from a vinyl monomer copolymerizable with the monomer unit derived from alkyl methacrylate having an alkyl group having 1 to 4 carbon atoms in an amount of more than 0% by weight and 50% by weight or less.

The "alkyl methacrylate having an alkyl group having 1 to 4 carbon atoms" is a compound represented by $CH_2$=CH($CH_3$)COOR (R is an alkyl group having 1 to 4 carbon atoms). The vinyl monomer copolymerizable with alkyl methacrylate having an alkyl group having 1 to 4 carbon atoms is copolymerizable with alkyl methacrylate having an alkyl group having 1 to 4 carbon atoms, and is a monomer having a vinyl group.

Examples of the alkyl methacrylate having an alkyl group having 1 to 4 carbon atoms can include methyl methacrylate, ethyl methacrylate, n-propyl methacrylate, isopropyl methacrylate, n-butyl methacrylate, tert-butyl methacrylate, sec-butyl methacrylate, and isobutyl methacrylate. The alkyl methacrylate having an alkyl group having 1 to 4 carbon atoms is preferably methyl methacrylate. The alkyl methacrylates may be used alone or as a mixture of two or more thereof.

Examples of the vinyl monomer copolymerizable with alkyl methacrylate having an alkyl group having 1 to 4 carbon atoms can include methacrylate (excluding alkyl methacrylate having an alkyl group having 1 to 4 carbon atoms) such as cyclohexyl methacrylate, benzyl methacrylate, 2-ethylhexyl methacrylate, 2-hydroxyethyl methacrylate, hydroxypropyl methacrylate, or monoglycerol methacrylate; acrylate such as methyl acrylate, ethyl acrylate, propyl acrylate, butyl acrylate, 2-ethylhexyl acrylate, 2-hydroxyethyl acrylate, 2-hydroxypropyl acrylate, or monoglycerol acrylate; unsaturated carboxylic acid such as acrylic acid, methacrylic acid, maleic acid, itaconic acid, maleic anhydride, or itaconic anhydride, or an acid anhydride thereof; a nitrogen-containing monomer such as acrylamide, methacrylamide, acrylonitrile, methacrylonitrile, diacetone acrylamide, or dimethylaminoethyl methacrylate; an epoxy group-containing monomer such as allyl glycidyl ether, glycidyl acrylate, or glycidyl methacrylate; and a styrene-based monomer such as styrene or α-methylstyrene.

An example of a method of producing the polymer can include a method of polymerizing alkyl methacrylate having an alkyl group having 1 to 4 carbon atoms, and if necessary, a vinyl monomer copolymerizable with alkyl methacrylate having an alkyl group having 1 to 4 carbon atoms, by a bulk polymerization method, a solution polymerization method, a suspension polymerization method, or an emulsion polymerization method.

Polycarbonate-Based Resin

A polymer contained in the polycarbonate-based resin is a polymer containing a structural unit derived from a dihydroxy compound. Examples of the polymer can include a polymer obtained by reacting a dihydroxy compound such as dihydric phenol or isosorbide with a carbonylation agent by an interfacial polycondensation method or a melt transesterification method; a polymer obtained by polymerizing a carbonate prepolymer by a solid phase transesterification method; and a polymer obtained by polymerizing a cyclic carbonate compound by a ring opening polymerization method.

Examples of the dihydric phenol can include hydroquinone, resorcinol, 4,4'-dihydroxydiphenyl, bis(4-hydroxyphenyl)methane, bis{(4-hydroxy-3,5-dimethyl)phenyl}methane, 1,1-bis(4-hydroxyphenyl)ethane, 1,1-bis(4-hydroxyphenyl)-1-phenylethane, 2,2-bis(4-hydroxyphenyl)propane (commonly called bisphenol A), 2,2-bis{(4-hydroxy-3-methyl)phenyl}propane, 2,2-bis{(4-hydroxy-3,5-dimethyl)phenyl}propane, 2,2-bis{(4-hydroxy-3,5-dibromo)phenyl}propane, 2,2-bis{(3-isopropyl-4-hydroxy)phenyl}propane, 2,2-bis{(4-hydroxy-3-phenyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,4-bis(4-hydroxyphenyl)-2-methylbutane, 2,2-bis(4-hydroxyphenyl)pentane, 2,2-bis(4-hydroxyphenyl)-4-methylpentane, 1,1-bis(4-hydroxyphenyl)cyclohexane, 1,1-bis(4-hydroxyphenyl)-4-isopropylcyclohexane, 1,1-bis(4-hydroxyphenyl)-3,3,5-trimethylcyclohexane, 9,9-bis(4-hydroxyphenyl)fluorene, 9,9-bis{(4-hydroxy-3-methyl)phenyl}fluorene, α,α'-bis(4-hydroxyphenyl)-o-diisopropylbenzene, α,α'-bis(4-hydroxyphenyl)-m-diisopropylbenzene, α,α'-bis(4-hydroxyphenyl)-p-diisopropylbenzene, 1,3-bis(4-hydroxyphenyl)-5,7-dimethyladamantane, 4,4'-dihydroxydiphenyl sulfone, 4,4'-dihydroxydiphenyl sulfoxide, 4,4'-dihydroxydiphenyl sulfide, 4,4'-dihydroxydiphenyl ketone, 4,4'-dihydroxydiphenyl ether, and 4,4'-dihydroxydiphenyl ester. These dihydric phenols may be used alone or in combination of two or more thereof.

Among the dihydric phenols, bisphenol A, 2,2-bis{(4-hydroxy-3-methyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,2-bis(4-hydroxyphenyl)-4-methylpentane, 1,1-bis(4-hydroxyphenyl)-3,3,5-trimethylcyclohexane, or α,α'-bis(4-hydroxyphenyl)-m-diisopropylbenzene is preferable. In particular, it is preferable that bisphenol A is used alone, or bisphenol A and at least one selected from the group consisting of 1,1-bis(4-hydroxyphenyl)-3,3,5-trimethylcyclohexane, 2,2-bis{(4-hydroxy-3-methyl)phenyl}propane, and α,α'-bis(4-hydroxyphenyl)-m-diisopropylbenzene are used in combination.

Examples of the carbonylation agent can include a carbonyl halide (such as phosgene), a carbonate ester (such as diphenyl carbonate), and a haloformate (such as dihaloformate of dihydric phenol). These dihydric phenols may be used alone or in combination of two or more thereof.

The resin pellet according to the present embodiment has high transportability in a solid state in a feeder. Accordingly, it is possible to increase a conveyance amount of resin pellet in a portion of a screw portion of a molding machine in which the resin pellet in a solid state is conveyed, or in a feeder portion that conveys the resin pellet to the molding machine.

The resin pellet according to the present embodiment can be provided to various molding machines to obtain any molded article. For example, the resin pellet can be provided to an injection molding machine to obtain a film, a tube, a bar-shaped material, a laminated product, or the like. Further, the resin pellet can be provided to an injection molding machine to obtain a molded article along a shape of a mold.

Method of Producing Resin Pellet

Subsequently, a method of producing the resin pellet will be described. The resin pellet can be produced by a so-called underwater cut method including extruding molten resin from through-holes of a die plate, and cutting the extruded resin on an outer surface of the die plate while cooling the extruded resin with water.

Figure 3:
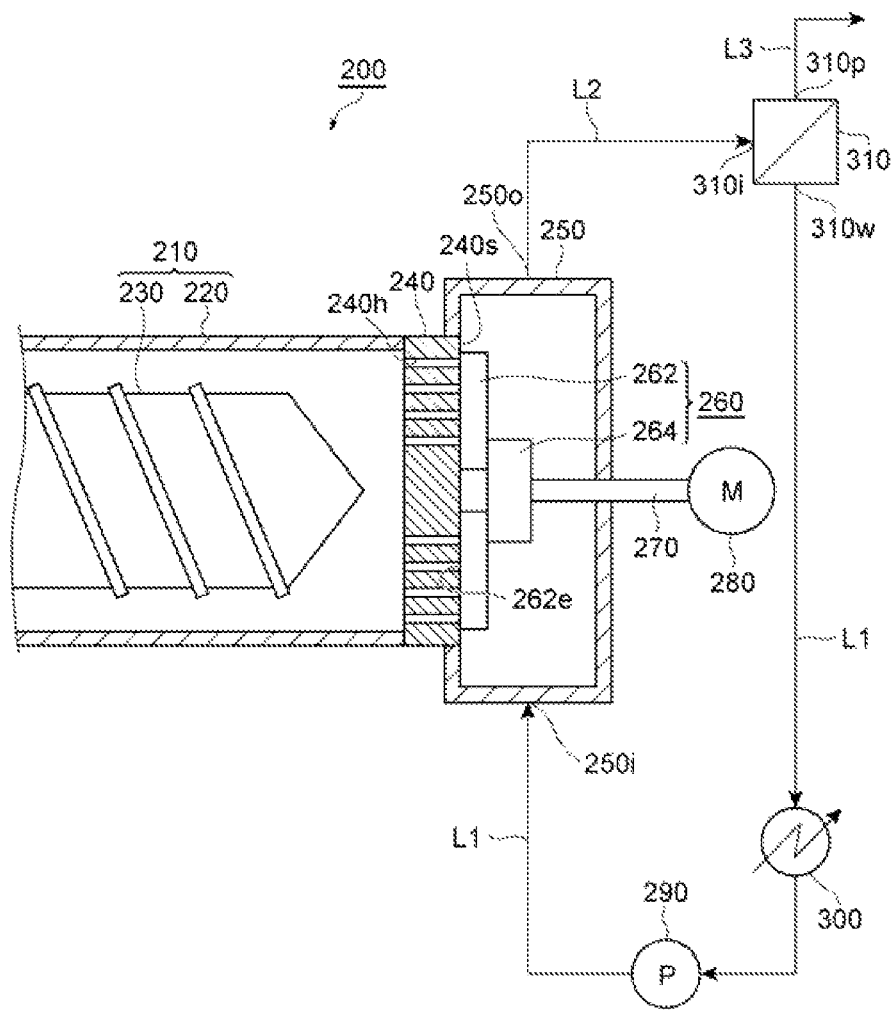
FIG. 3 is a schematic cross-sectional view of a pelletizing extruder unit used in production of the resin pellet according to the present invention.
Figure 4:
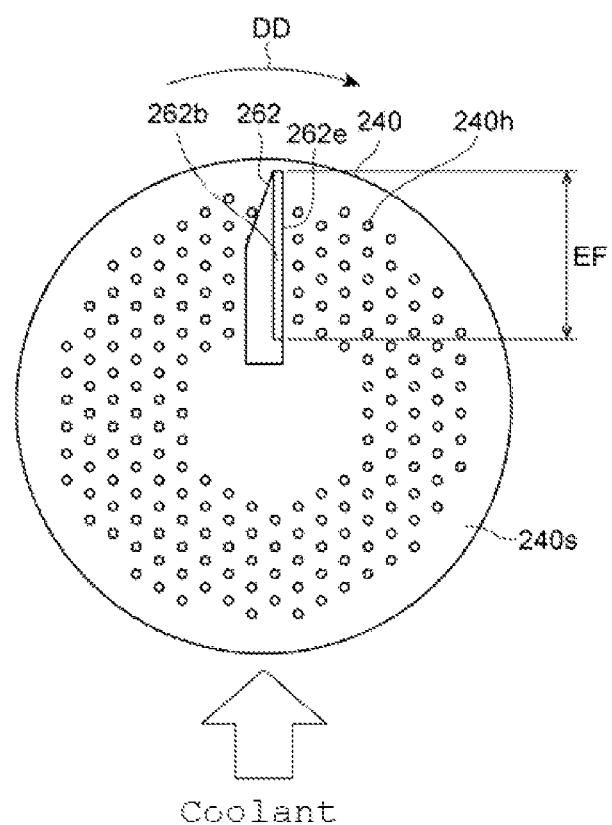
FIG. 4 is a front view of an outer surface of a die plate of FIG. 3.
Figure 5:
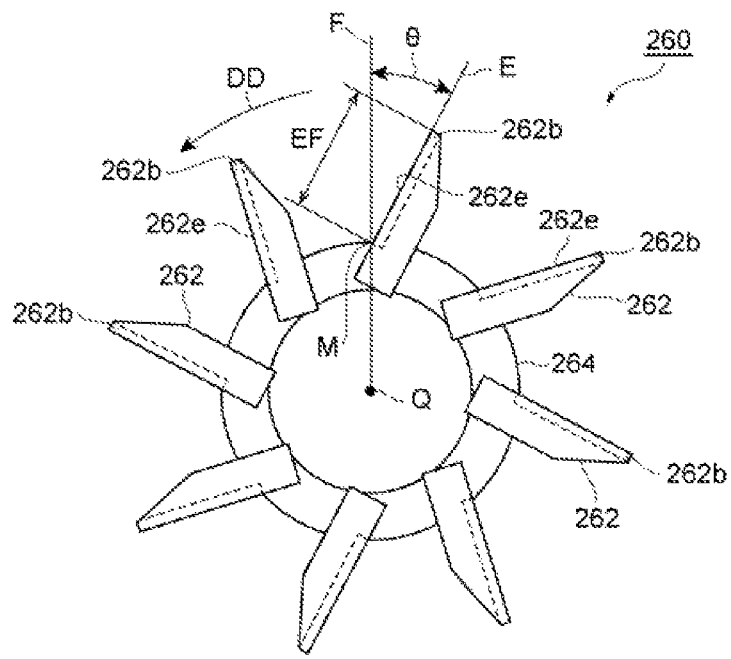
FIG. 5 is a front view of a rotary cutter of FIG. 3.

FIG. 3 is a schematic view illustrating an example of a resin pelletizing extruder unit 200 used in the present embodiment. FIG. 4 is a schematic view illustrating an outer main surface 240s of a die plate. FIG. 5 is a front view illustrating a rotary cutter 260.

The resin pelletizing extruder unit 200 includes an extruder 210 having a cylinder 220 and a screw 230, a plate-shaped die plate 240 provided at a tip of the cylinder 220, a cover 250 covering the outer main surface 240s of the die plate 240, the rotary cutter 260 disposed on the outer main surface 240s of the die plate 240, a rotary shaft 270 connected to the rotary cutter 260, a motor 280, a pump 290, a cooler 300, and a liquid-solid separator 310.

Any extruder may be used as the extruder 210 as long as it can melt a resin and extrudes the molten resin from the die plate 240. The die plate 240 has a plate shape, and has plural through-holes 240h penetrating the die plate 240 in a thickness direction. As illustrated in FIG. 4, the through-holes 240h are arranged in a ring shape around the center of the outer main surface 240s of the die plate 240. A diameter of the through-hole 240h is not particularly limited, but can be 2.0 to 4.0 mm. A cross-sectional shape of the through-hole 240h can be a circular shape.

Although not illustrated in the drawings, a channel for a heat medium such as steam is provided inside the die plate 240 so that the temperature of the die plate 240 itself can be maintained at an appropriate high-temperature, even though coolant is supplied on the outer main surface 240s of the die plate 240.

As illustrated in FIG. 3, the rotary cutter 260 has a plurality of cutter members 262 and a holder 264 holding the plurality of cutter members 262. The holder 264 is fixed to the rotary shaft 270. The cutter members 262 are provided with blade portions 262b having blade edges 262e, respectively. The rotary cutter 260 is disposed in such a manner that the blade portions 262b come into contact with the outer main surface 240s of the die plate 240.

As illustrated in FIG. 5, when viewed from a side of the rotary cutter 260 that comes into contact with the die plate 240 from an axial direction of the rotary cutter 260, the blade edge 262e of each blade portion 262b has a linear shape.

In FIGS. 4 and 5, an effective length EF of the blade portion 262b, that is, a length of the blade edge 262e, is not particularly limited, but can be 60 to 120 mm.

As illustrated in FIG. 5, when viewed from a side of the rotary cutter 260 that comes into contact with the die plate 240 from the axial direction of the rotary cutter 260, an extending direction E of the blade edge 262e is inclined at an angle θ in a direction opposite to a rotating direction DD of the rotary cutter 260 based on a line F connecting a rotation center Q of the rotary cutter 260 and an end M of the blade edge 262e that is close to the rotation center of the rotary cutter 260. The angle θ is referred to as a "sweepback angle".

The sweepback angle θ is 20° to 50°, preferably 25° to 45°, and more preferably 25° to 35°.

As illustrated in FIG. 3, the outer main surface 240s of the die plate 240 and the rotary cutter 260 are housed in the cover 250. The rotary shaft 270 penetrates the cover 250, and a penetrated portion of the rotary shaft 270 is connected to the motor 280 that is provided outside the cover 250.

A line L1 is connected to a water inlet 250i at a lower portion of the cover 250. The pump 290, the cooler 300, and a water outlet 310w of the liquid-solid separator 310 are sequentially connected to the line L1 from an upstream side. An inlet 310*i* of the liquid-solid separator 310 and a water outlet 250*o* at the upper portion of the cover 250 are connected to each other by a line L2. A line L3 is connected to a particle outlet 310*p* of the liquid-solid separator 310.

As an example, the liquid-solid separator 310 is a filter.

Subsequently, an example of a method of producing the resin pellet using the resin pelletizing extruder unit 200 will be described.

First, a raw material resin is molten by the extruder 210, and if necessary, kneaded, and then extruded from the through-holes 240*h* of the die plate 240.

An injection line speed of the resin is generally 200 mm/s to 500 mm/s, and preferably 300 mm/s to 400 mm/s.

The amount of resin extruded is generally 1.0 ton/h to 15 ton/h, preferably 1.5 ton/h to 10 ton/h, and more preferably 2.0 ton/h to 5.0 ton/h.

An injection pressure of the resin is generally 4 MPa to 25 MPa, and preferably 10 MPa to 20 MPa.

An injection temperature of the resin can be appropriately set depending on a resin. The injection temperature of the resin is generally 200° C. to 300° C., and preferably 220° C. to 250° C.

Simultaneously with the injection of the resin, the rotary cutter 260 is rotated while supplying a fixed amount of coolant to the cover 250 from the pump 290 and cooling the extruded resin, and the resin extruded from the through-holes 240*h* is continuously cut. Thus, the resin pellet 10 is obtained.

The resin pellet obtained by cutting is discharged together with the coolant supplied to the cover 250 through the line L2, and is supplied to the liquid-solid separator 310 as a mixture. The mixture is separated into particles and water in the liquid-solid separator 310, the separated particles are discharged through the line L3, and if necessary, the discharged particles are sent to a subsequent process such as drying treatment. On the other hand, the separated water is cooled through the line L1 by the cooler 300, if necessary, and then the water is circulated by the pump 290 to be utilized.

A flow rate of the coolant supplied to the cover 250 is 80 m$^3$/h to 160 m$^3$/h. The flow rate of the coolant is preferably 100 m$^3$/h to 140 m$^3$/h, and more preferably 110 m$^3$/h to 130 m$^3$/h. The flow rate of the coolant can be appropriately adjusted depending on the amount of resin extruded in the above range.

An angle formed by a flow direction of the coolant in the cover 250 and an injection direction of the resin is preferably 80° to 100°, and more preferably 85° to 95°. It should be noted that the flow direction of the coolant is a direction connecting the water inlet 250*i* and the water outlet 250*o* of the cover 250, and in the embodiment of FIG. 3, the flow direction is vertically upward. In addition, the injection direction of the molten resin is an axial direction of the through-hole 240*h* of the die plate 240. In the embodiment of FIG. 3, the injection direction of the resin is a horizontal direction. Therefore, in the embodiment of FIG. 3, the angle formed by the flow direction of the coolant and the injection direction of the resin is 90°.

As illustrated in FIG. 3, it is preferable that the flow direction of the coolant in the cover 250 is a vertical direction, and the injection direction of the molten resin is a horizontal direction. In particular, it is more preferable that the flow direction of the coolant is a vertically upward direction.

The temperature of the coolant supplied to the cover 250 is generally 10° C. to 70° C., preferably 20° C. to 60° C., and more preferably 30° C. to 50° C.

A rotational speed of the rotary cutter 260 is generally 100 rpm to 2,000 rpm, preferably 400 rpm to 1,200 rpm, and more preferably 600 rpm to 1,000 rpm.

The temperature of steam supplied to the channel for a heat medium of the die plate 240 can be appropriately set depending on the resin, but is generally 150° C. to 250° C., and preferably 180° C. to 220° C.

In the present embodiment, in particular, the flow rate of the coolant is set to 80 to 160 m$^3$/h by using a cutter mounted at a sweepback angle θ of 20° to 40°, such that the resin pellet can be preferably produced.

The resin pellet according to the present embodiment can be produced by a method other than the above embodiment.

For example, the number of blades of the rotary cutter can be appropriately changed.

EXAMPLES

Example 1

High-pressure low-density polyethylene was produced by a high-pressure radical polymerization method using a vessel reactor at a reaction temperature of 235° C., a reaction pressure of 190 MPa, and a gas amount of 16 ton/h. A production amount was 3 ton/h. As a result of performing a sampling test for physical properties of the polymer, a melt flow rate (MFR) of the obtained high-pressure low-density polyethylene was 3.5 (g/10 min), and a density thereof was 924 (kg/m$^3$).

Unreacted gas was separated and removed from the produced polymer by a high and low pressure separator, the polymer was sent to an extruder, and a molten polymer was extruded from through-holes of a die plate. The extruded molten polymer was solidified by coolant using the pelletizing extruder unit illustrated in FIG. 3 and the solidified polymer was cut by a rotary cutter, thereby producing a resin pellet.

The amount of polymer extruded was 3 ton/h, the temperature of the polymer supplied to the die plate was 234° C., the temperature of steam supplied to a channel for a heat medium in the die plate was 195° C., the temperature of the coolant (PCW) supplied to a cover was 46° C., and the flow rate of the coolant was 120 m$^3$/h. The rotary cutter had eight cutters, a cutter mounting sweepback angle θ was 30°, and a rotational speed of the rotary cutter was 687 rpm. The resin pellet thus obtained had a recess.

Example 2

A resin pellet was produced under the same conditions as those of Example 1, except that the rotational speed of the rotary cutter was changed to 653 rpm. The obtained resin pellet had a recess.

Example 3

A resin pellet was produced under the same conditions as those of Example 1, except that the rotational speed of the rotary cutter was 652 rpm and the temperature of steam supplied to the channel for a heat medium of the die plate was changed to 210° C. The obtained resin pellet had a recess.

Comparative Example 1

High-pressure low-density polyethylene was produced by a high-pressure radical polymerization method using a vessel reactor at a reaction temperature of 230° C., a reaction pressure of 165 MPa, and a gas amount of 15.7 ton/h. A production amount was 2.4 ton/h. As a result of performing a sampling test for physical properties of the polymer, an MFR of the obtained high-pressure low-density polyethylene was 3.5 (g/10 min), and a density thereof was 924 (kg/m$^3$).

A resin pellet was produced under the same conditions as those of Example 1, except that the amount of polymer extruded was 2.4 ton/h, the temperature of the polymer supplied to the die plate was 257° C., the temperature of steam supplied to the channel for a heat medium in the die plate was 210° C., the flow rate of the coolant was 52 m$^3$/h, the number of cutters included in the rotary cutter was six, the cutter mounting sweepback angle θ was 0°, and the rotational speed of the rotary cutter was 844 rpm. The resin pellet thus obtained did not have a recess. Although the resin pellet did not have a recess, a size of the smallest width was measured as a height.

Evaluation of Polymer (1) Melt Flow Rate (MFR, Unit: g/10 Min)

The melt flow rate of the polymer was measured by the method A at a temperature of 190° C. and a load of 2.16 kg according to the method defined in JIS K7210-1.

(2) Density (Unit: Kg/m$^3$)

The density of the polymer was measured by the method A according to the method defined in JIS K7112 after performing annealing according to JIS K6922-2.

Evaluation of Resin Pellet (i) Measurement of Shape of Pellet by Stereoscopic Microscope Observation The resin pellet was disposed on a horizontal plane in such a manner that a recess of the resin pellet faced the horizontal plane, and a height T1, a maximum diameter L as viewed from above, and a diameter L' orthogonal to the maximum diameter L were measured by the following conditions (1) to (4) using a stereoscopic microscope. An arithmetic average value of an aspect ratio (L/T1) of each of four resin pellets was calculated and defined as an aspect ratio of the resin pellet.
  (1) Stereoscopic microscope: SMZ1000-3 standard BD set, manufactured by Nikon Corporation
  (2) Light source: light only one division in LED LIGHTING FOR STEREOSCOPIC MICROSCOPE 1-9227-02 4-direction independent vertical, manufactured by AS ONE Corporation
  (3) Objective lens: ×0.5
  (4) Zoom: 2×
(ii) Measurement of Shape of Resin Pellet by X-Ray CT Measurement A shape of the resin pellet was measured by the following conditions (11) to (16) using an X-ray CT apparatus. Four resin pellets that are the same as the resin pellets used for the stereoscopic microscope observation were measured, and an average value thereof was calculated.
  (11) Three-dimensional measurement X-ray CT apparatus: TDM1000-IS/SP, manufactured by Yamato Scientific co., ltd.
  (12) Three-dimensional volume rendering software: VG-Studio MAX, manufactured by Volume Graphics GmbH
  (13) Tube voltage: 50 kV
  (14) Tube current: 20 pA
  (15) Number of pixels: 512×512 pixel
  (16) Visual field size: 13.0 mmφ×13.0 mmh
(1) Disposition of Resin Pellet Four resin pellets were fixed on a surface of a disk-shaped sample table using a double-sided tape. The resin pellets were fixed to the sample table in such a manner that recesses of the four resin pellets were placed in the same direction (the directions of the heights T1 were parallel to each other and in a horizontal direction in the stereoscopic microscope measurement observation) and each of the directions of the maximum diameters L was a vertical direction.

(2) Obtaining of X-Ray CT Image

Horizontal cross-sectional images of the fixed four resin pellets were sequentially obtained from an upper end to the other end with a pitch of a vertical axis of 25 μm by an X-ray CT apparatus, as illustrated in FIG. 2.

(3) Obtaining of Specific Image and Measurement of Each Parameter

An image in which the depth D of the recess is the deepest among the horizontal cross-sectional images for each of the resin pellets was selected to obtain a specific image. For each resin pellet, a depth D of the recess, a width W of the recess, a height T2 of the recess, a length C of a curve of the recess, and a width S of the resin pellet in FIG. 2 were measured by using the specific image. Each value was defined as an arithmetic average value of four particles.

(iii) Evaluation of Transport Amount of Resin Pellet

A transport amount of the resin pellet in a solid state was evaluated by the following conditions (21) to (27) using a pellet feeder of LABO PLASTOMILL 2D25-S. A rotational speed of a screw was fixed by fixing a dial gauge scale of the pellet feeder of a twin-screw extruder (LABO PLASTO-MILL 2D25-S, manufactured by Toyo Seiki Seisaku-sho, Ltd.) to 5. At this time, a rotational speed when a contact-type tachometer was in contact with the tip of the screw was 60 rpm. 600 g of the resin pellet was injected into a pellet feeder hopper, and the resin pellet in a solid state transported for 5 minutes from 1 minute to 6 minutes was weighed. The measurement was repeated three times to calculate an average value, and the average value was defined as a transport amount (unit: kg/h).
  (21) Apparatus: pellet feeder of LABO PLASTOMILL 2D25-S, manufactured by Toyo Seiki Seisaku-sho, Ltd.
  (22) Feeder type: diameter of auger type screw 22 mmφ
  (23) Feeder driving: stepless speed change gear motor 100 v 25 w
  (24) Hopper filling quantity: 600 g
  (25) Rotational speed of feeder screw: 60 rpm
  (26) Purge time: 1 min
  (27) Discharge amount measurement time: 5 min
(iv) Volume of Resin Pellet (Unit: Mm$^3$)

An interface between the resin pellet and the sample table was trimmed by using the images of the four resin pellets fixed in (1) that are obtained by the X-ray CT apparatus, to extract one resin pellet. Next, the resin pellet and other portions are binarized into white and black, respectively, a volume of the resin pellet was calculated by VG-Studio MAX (manufactured by Volume Graphics GmbH). Then, an arithmetic average value of the volumes of the four resin pellets and a standard deviation in volume of the four resin pellets were calculated.

(v) Surface Area of Resin Pellet (unit: mm$^2$)

An interface between the resin pellet and the sample table was trimmed by using the images of the four resin pellets fixed in (1) that are obtained by the X-ray CT apparatus, to extract one resin pellet. Next, the resin pellet and other portions are binarized into white and black, respectively, a surface area of the resin pellet was calculated by VG-Studio MAX (manufactured by Volume Graphics GmbH). Then, an arithmetic average value of the surface areas of the four resin pellets and a standard deviation in surface area of the four resin pellets were calculated.

(vi) Weight of Resin Pellet (Unit: Mg)

Weights of the four resin pellets were measured, and an arithmetic average value of the weights of the four resin pellets and a standard deviation in weight of the four resin pellets were calculated.

These volume, surface area, and weight standard deviations of the resin pellet are parameters relating to a grain size distribution of the resin pellet.

(vii) HDD Hardness of Resin Pellet

An HDD hardness of each of the four resin pellets was measured by using a durometer indenter (type D) of a durometer hardness tester Model RH-201AL (manufactured by Excell Corporation) according to the method defined in JIS K7215-1986. Specifically, the resin pellet was disposed in such a manner that the recess of the resin pellet faced the sample table, and an approximate center position of the resin pellet was pressed with the indenter, thereby measuring a hardness of the resin pellet. Then, an arithmetic average value of the hardnesses of the four resin pellets was calculated.

The results are shown in Table 1.

TABLE 1

| | | Example 1 | Example 2 | Example 3 | Comparative Example 1 |
|---|---|---|---|---|---|
| | Amount of coolant (m$^3$/h) | 120 | 120 | 120 | 53 |
| | Cutter mounting angle | Sweepback angle 30° | Sweepback angle 30° | Sweepback angle 30° | Sweepback angle 0° |
| Measurement by stereoscopic microscope | Maximum diameter L (mm) | 3.96 | 3.92 | 3.97 | 4.24 |
| | Second diameter L' (mm) | 3.64 | 3.76 | 3.74 | 3.92 |
| | Thickness T1 (mm) | 2.81 | 2.73 | 2.68 | 2.74 |
| | Aspect ratio (L/T1) | 1.41 | 1.43 | 1.48 | 1.55 |
| Measurement by X-ray CT image | CT cross-section measurement pitch (μm) | 25 | 25 | 25 | 25 |
| | Width W (mm) of recess | 1.86 | 2.14 | 1.99 | — |
| | Depth D (mm) of recess | 0.49 | 0.32 | 0.33 | — |
| | Length C (mm) of curve of recess | 2.18 | 2.31 | 2.15 | — |
| | Width S (mm) of pellet | 3.66 | 3.77 | 3.62 | — |
| | Height T2 (mm) of pellet | 2.71 | 2.54 | 2.57 | — |
| | Width W of recess/depth D of recess | 3.8 | 6.8 | 6.0 | — |
| | Width W of recess/width S of pellet | 0.13 | 0.08 | 0.09 | — |
| | Depth D of recess/height T2 of pellet | 0.18 | 0.12 | 0.13 | — |
| | Transport amount in solid transport portion of extruder | 5.3 | 5.6 | 5.5 | 5.1 |
| | Average volume (mm$^3$) of pellet | 21.4 | 21.5 | 21.3 | 21.5 |
| | Volume standard deviation (mm$^3$) of pellet | 1.4 | 0.8 | 1.0 | 3.7 |
| | Average surface area (mm$^2$) of pellet | 43.2 | 43.2 | 44.6 | 45.2 |
| | Surface area standard deviation (mm$^2$) of pellet | 1.8 | 0.9 | 3.5 | 4.6 |
| | Average weight (mg) of pellet | 20.3 | 20.3 | 20.1 | 20.3 |
| | Weight standard deviation (mg) of pellet | 1.3 | 0.7 | 1.0 | 3.5 |
| | HDD hardness of pellet | 64.0 | 65.8 | 66.8 | 62.6 |

It was observed that the resin pellet having a recess and a specific aspect ratio was excellent in transportability.

What is claimed is:

1. A resin pellet having an upper portion and a lower portion opposite to the upper portion, the lower portion has a recess, wherein a height of the resin pellet disposed on a horizontal plane so that the recess faces the horizontal plane is T1, a maximum diameter of the resin pellet from a direction perpendicular to the horizontal plane is L, and an aspect ratio of the resin pellet defined as L/T1 is 1.2 to 1.8, wherein the upper portion has a rounded profile so that a distance from the horizontal plane has a maximum at a central portion of the upper portion while gradually decreasing towards a peripheral portion of the upper portion and wherein the central portion of the upper portion is above the recess of the lower portion in the direction perpendicular the horizontal plane, wherein when cross-sectional images of the resin pellet perpendicular to the horizontal plane and perpendicular to a direction of the maximum diameter L are obtained by an X-ray CT apparatus at regular intervals in the direction of the maximum diameter L, a width W of the recess in the cross-sectional image, in which a depth D of the recess is maximized is 1.7 mm to 2.3 mm, where the depth D of the recess is a distance between a tangent line tangent to two protrusions on both sides of the recess and the deepest portion of the recess in the cross-sectional image, in which a depth D of the recess is maximized, and the width W of the recess is a distance between tangent points of the two protrusions on the tangent line in the cross-sectional image, in which a depth D of the recess is maximized.

2. The resin pellet of claim 1, wherein the aspect ratio is from 1.4 to 1.5.

3. The resin pellet of claim 1, wherein a volume standard deviation of the resin pellet is 0.5 to 3.5 mm$^3$.

4. The resin pellet of claim 1, wherein a surface area standard deviation of the resin pellet is 0.5 to 4.0 mm$^2$.

5. The resin pellet of claim 1, wherein a weight standard deviation of the resin pellet is 0.5 to 3.0 mg.

6. The resin pellet of claim 1, wherein an HDD hardness of the resin pellet is 60 to 70.

7. The resin pellet of claim 1, wherein a resin of the resin pellet is a polyolefin-based resin.

8. The resin pellet of claim 1, wherein a resin of the resin pellet is a polyethylene-based resin.

9. The resin pellet of claim 1, wherein when cross-sectional images of the resin pellet perpendicular to the horizontal plane and perpendicular to a direction of the maximum diameter L are obtained by an X-ray CT apparatus at regular intervals in the direction of the maximum diameter L, a depth D of the recess in the cross-sectional image, in which the depth D of the recess is maximized, is 0.2 mm to 0.6 mm, where the depth D of the recess is a distance between a tangent line tangent to two protrusions on both sides of the recess and the deepest portion of the recess in the cross-sectional image, in which a depth D of the recess is maximized.

10. The resin pellet of claim 1, wherein when cross-sectional images of the resin pellet perpendicular to the horizontal plane and perpendicular to a direction of the maximum diameter L are obtained by an X-ray CT apparatus at regular intervals in the direction of the maximum diameter L, a length C of a curve of the recess in the cross-sectional image in which a depth D of the recess is maximized is 2.0 mm to 2.4 mm, where the depth D of the recess is a distance between a tangent line tangent to two protrusions on both sides of the recess and the deepest portion of the recess in the cross-sectional image, and the length C of the curve of the recess is a length between two tangent points tangent to the tangent line in a contour of the resin pellet in the cross-sectional image.

11. A resin pellet having an upper portion and a lower portion opposite to the upper portion, the lower portion has a recess, wherein a height of the resin pellet disposed on a horizontal plane so that the recess faces the horizontal plane is T1, a maximum diameter of the resin pellet from a direction perpendicular to the horizontal plane is L, and an aspect ratio of the resin pellet defined as L/T1 is 1.2 to 1.8, wherein the upper portion has a rounded profile so that a distance from the horizontal plane has a maximum at a central portion of the upper portion while gradually decreasing towards a peripheral portion of the upper portion and wherein the central portion of the upper portion is above the recess of the lower portion in the direction perpendicular the horizontal plane, wherein when cross-sectional images of the resin pellet perpendicular to the horizontal plane and perpendicular to a direction of the maximum diameter L are obtained by an X-ray CT apparatus at regular intervals in the direction of the maximum diameter L, a depth D of the recess in the cross-sectional image in which the depth D of the recess is maximized is 0.2 mm to 0.6 mm, where the depth D of the recess is a distance between a tangent line tangent to two protrusions on both sides of the recess and the deepest portion of the recess in the cross-sectional image, in which a depth D of the recess is maximized.

12. The resin pellet of claim 11, wherein when cross-sectional images of the resin pellet perpendicular to the horizontal plane and perpendicular to a direction of the maximum diameter L are obtained by an X-ray CT apparatus at regular intervals in the direction of the maximum diameter L, a length C of a curve of the recess in the cross-sectional image in which a depth D of the recess is maximized is 2.0 mm to 2.4 mm, where the depth D of the recess is a distance between a tangent line tangent to two protrusions on both sides of the recess and the deepest portion of the recess in the cross-sectional image, in which a depth D of the recess is maximized, and the length C of the curve of the recess is a length between two tangent points tangent to the tangent line in a contour of the resin pellet in the cross-sectional image, in which a depth D of the recess is maximized.

13. A resin pellet having an upper portion and a lower portion opposite to the upper portion, the lower portion has a recess, wherein a height of the resin pellet disposed on a horizontal plane so that the recess faces the horizontal plane is T1, a maximum diameter of the resin pellet from a direction perpendicular to the horizontal plane is L, and an aspect ratio of the resin pellet defined as L/T1 is 1.2 to 1.8, wherein the upper portion has a rounded profile so that a distance from the horizontal plane has a maximum at a central portion of the upper portion while gradually decreasing towards a peripheral portion of the upper portion and wherein the central portion of the upper portion is above the recess of the lower portion in the direction perpendicular the horizontal plane, wherein when cross-sectional images of the resin pellet perpendicular to the horizontal plane and perpendicular to a direction of the maximum diameter L are obtained by an X-ray CT apparatus at regular intervals in the direction of the maximum diameter L, a length C of a curve of the recess in the cross-sectional image, in which a depth D of the recess is maximized, is 2.0 mm to 2.4 mm, where the depth D of the recess is a distance between a tangent line tangent to two protrusions on both sides of the recess and the deepest portion of the recess in the cross-sectional image, in which a depth D of the recess is maximized, and the length C of the curve of the recess is a length between two tangent points tangent to the tangent line in a contour of the resin pellet in the cross-sectional image, in which a depth D of the recess is maximized.

14. A resin pellet having an upper portion and a lower portion opposite to the upper portion, the lower portion has a recess, wherein a height of the resin pellet disposed on a horizontal plane so that the recess faces the horizontal plane is T1, a maximum diameter of the resin pellet from a direction perpendicular to the horizontal plane is L, and an aspect ratio of the resin pellet defined as L/T1 is 1.2 to 1.8, wherein the upper portion has a rounded profile so that a distance from the horizontal plane has a maximum at a central portion of the upper portion while gradually decreasing towards a peripheral portion of the upper portion and wherein the central portion of the upper portion is above the recess of the lower portion in the direction perpendicular the horizontal plane, wherein when cross-sectional images of the resin pellet perpendicular to the horizontal plane and perpendicular to a direction of the maximum diameter L are obtained by an X-ray CT apparatus at regular intervals in the direction of the maximum diameter L, a ratio (W/D) of a width W of the recess to a depth D of the recess in the cross-sectional image, in which the depth D of the recess, is maximized is 3.5 to 7.0, where the depth D of the recess is a distance between a tangent line tangent to two protrusions on both sides of the recess and the deepest portion of the recess in the cross-sectional image, in which a depth D of the recess is maximized, and the width W of the recess is a distance between tangent points of the two protrusions on the tangent line in the cross-sectional image, in which a depth D of the recess is maximized.

15. A resin pellet having an upper portion and a lower portion opposite to the upper portion, the lower portion has a recess, wherein a height of the resin pellet disposed on a horizontal plane so that the recess faces the horizontal plane is T1, a maximum diameter of the resin pellet from a direction perpendicular to the horizontal plane is L, and an aspect ratio of the resin pellet defined as L/T1 is 1.2 to 1.8, wherein the upper portion has a rounded profile so that a distance from the horizontal plane has a maximum at a central portion of the upper portion while gradually decreasing towards a peripheral portion of the upper portion and wherein the central portion of the upper portion is above the recess of the lower portion in the direction perpendicular the horizontal plane, wherein when cross-sectional images of the resin pellet perpendicular to the horizontal plane and perpendicular to a direction of the maximum diameter L are obtained by an X-ray CT apparatus at regular intervals in the direction of the maximum diameter L, a ratio (W/S) of a width W of the recess to a width S of the resin pellet in the cross-sectional image, in which a depth D of the recess is maximized, is 0.05 to 0.15, where the depth D of the recess is a distance between a tangent line tangent to two protrusions on both sides of the recess and the deepest portion of the recess in the cross-sectional image, in which a depth D of the recess is maximized, the width W of the recess is a distance between tangent points of the two protrusions on the tangent line in the cross-sectional image, in which a depth D of the recess is maximized, and the width S of the resin pellet is a distance between two second tangent lines perpendicular to the tangent line and having the resin pellet interposed therebetween in the cross-sectional image, in which a depth D of the recess is maximized.

16. A resin pellet having an upper portion and a lower portion opposite to the upper portion, the lower portion has a recess, wherein a height of the resin pellet disposed on a horizontal plane so that the recess faces the horizontal plane is T1, a maximum diameter of the resin pellet from a direction perpendicular to the horizontal plane is L, and an aspect ratio of the resin pellet defined as L/T1 is 1.2 to 1.8, wherein the upper portion has a rounded profile so that a distance from the horizontal plane has a maximum at a central portion of the upper portion while gradually decreasing towards a peripheral portion of the upper portion and wherein the central portion of the upper portion is above the recess of the lower portion in the direction perpendicular the horizontal plane, wherein when cross-sectional images of the resin pellet perpendicular to the horizontal plane and perpendicular to a direction of the maximum diameter L are obtained by an X-ray CT apparatus at regular intervals in the direction of the maximum diameter L, a ratio (D/T2) of a depth D of the recess to a height T2 of the resin pellet in the cross-sectional image, in which the depth D of the recess is maximized, is 0.1 to 0.2, where the depth D of the recess is a distance between a tangent line tangent to two protrusions on both sides of the recess and the deepest portion of the recess in the cross-sectional image, in which a depth D of the recess is maximized, and the height T2 of the resin pellet is a distance between the tangent line and a third tangent line parallel to the tangent line and having the resin pellet interposed between the tangent line and the third tangent line in the cross-sectional image, in which a depth D of the recess is maximized.

\* \* \* \* \*